April 2, 1929.  J. F. RICHARDSON  1,707,371
VEHICLE BRAKE
Original Filed Aug. 17, 1925  2 Sheets-Sheet 1
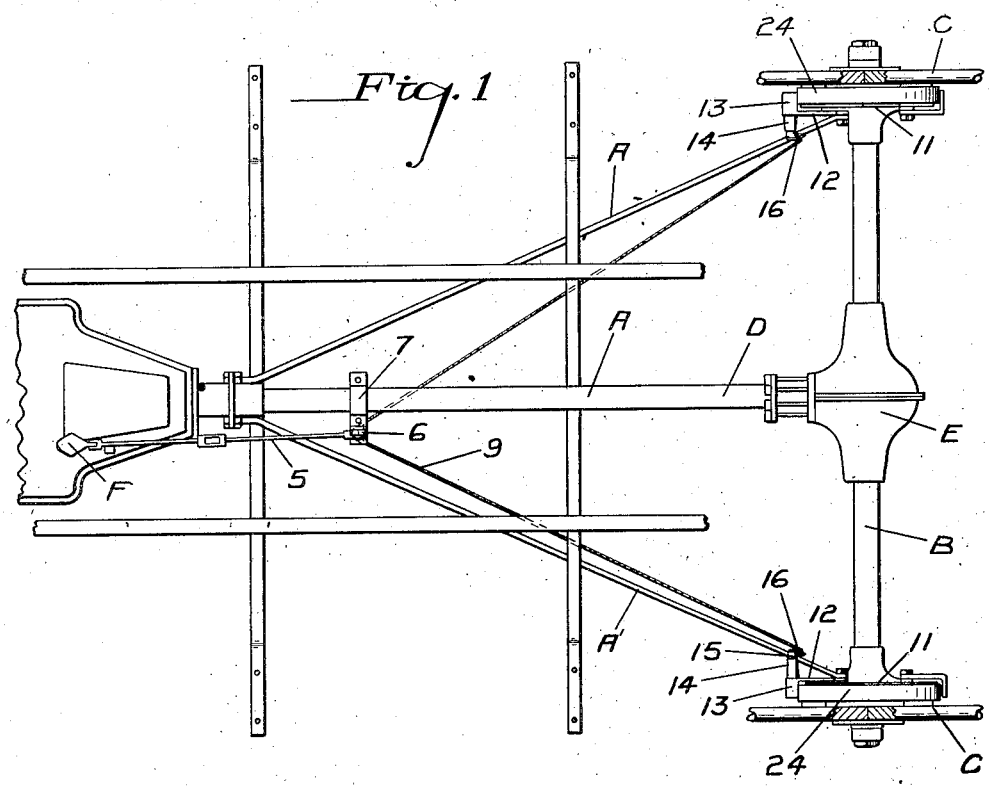
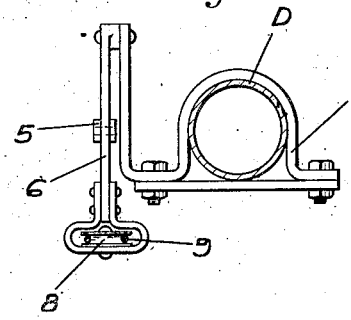
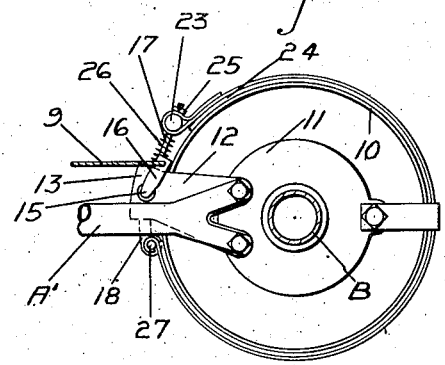
INVENTOR.
J. F. Richardson
BY W. T. Doolittle
ATTORNEY.

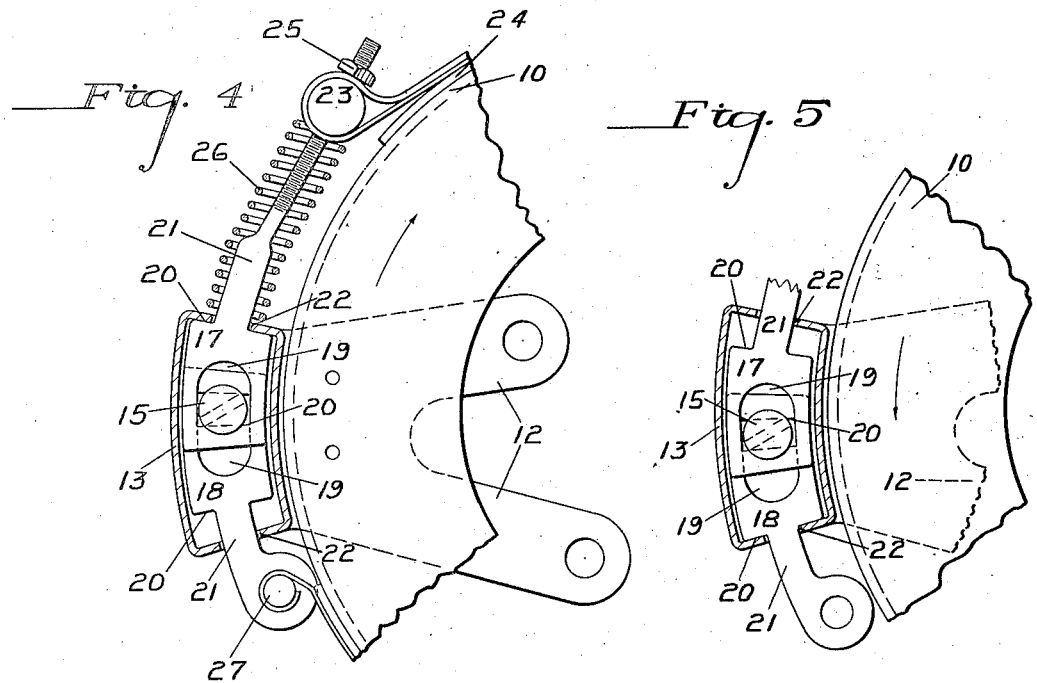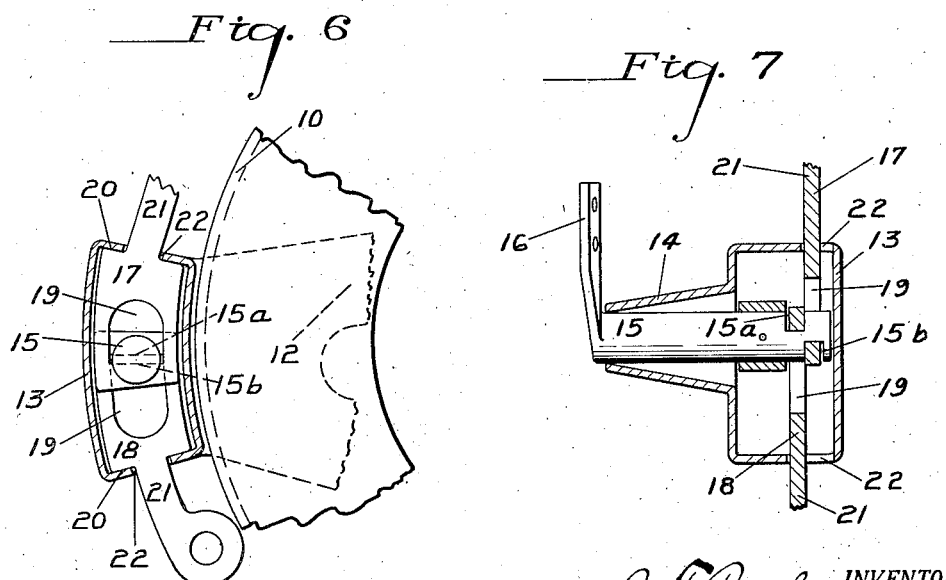

Patented Apr. 2, 1929.

1,707,371

UNITED STATES PATENT OFFICE.

JOHN F. RICHARDSON, OF PITTSBURGH, PENNSYLVANIA.

VEHICLE BRAKE.

Application filed August 17, 1925, Serial No. 50,649. Renewed June 25, 1927.

This invention is for a brake for vehicles, and is particularly designed to be used as an attachment for Ford automobiles, although it is also applicable to other vehicles.

Various types of brake attachments have been proposed for Ford automobiles. One of these is shown in my co-pending application, Serial No. 703,964, filed April 3, 1924. Many such brakes are unsatisfactory for the reason that if they are simple enough to be used as an attachment, they are extremely hard to operate, requiring excessive pressure on the foot pedal. They may also operate easily when the car is moving in one direction, but be difficult to set when the motion is in the other direction.

The present invention, which constitutes an improvement on my said co-pending application, has for its principal object to provide a brake especially applicable for use as an attachment for Ford automobiles which is of simple construction, and which will operate with a light pressure on the foot pedal, and will be equally effective when the car is going in either direction.

The invention may be readily understood by reference to the accompanying drawings in which:

Fig. 1 is a plan view of the rear portion of a Ford chassis, showing my invention applied thereto;

Fig. 2 is a detail view of cable operating lever and bracket;

Fig. 3 is an elevation of the inside of a brake drum with my invention applied thereto;

Fig. 4 is an enlarged detail view of a poriton of a brake drum with my invention applied thereto, showing the parts in the position they assume when the wheel is going in the direction of the arrow. This would be the direction of rotation of a car moving rearwardly;

Fig. 5 is a similar view showing the parts in the position they assume when braking a forwardly moving wheel;

Fig. 6 is a similar view showing the parts in released position; and

Fig. 7 is a transverse section through brake mechanism housing.

In the drawings, A designates the chassis of a vehicle, preferably a Ford automobile, having a rear axle B, wheels C, a drive shaft housing D, and differential gear casing E. At F is the usual brake pedal. Instead of operating on a drum in the differential, the pedal is connected by a link 5 to a lever 6 hung from a bracket 7 on the drive shaft housing, as best shown in Fig. 2. Lever 6 carries a pulley 8 around which passes an operating cable 9 whose opposite ends connect to the brake mechanisms for the respective wheels C.

Each wheel C has the usual brake drum 10 revolvable about a fixed disk 11. The radius rods A' of the chassis are bolted to the disks 11, in the usual manner, as best shown in Fig. 3. Secured to each disk 11, preferably by the same bolts that hold the radius rod in place, is a rigid arm 12 carrying a housing 13 on its outer end, and on this housing is a conical lateral extension 14. In the extension 14 is a shaft 15 whose outer end projects out of the casing and carries an arm 16. The shaft is free to rotate, and clearance is provided so that its inner end may swing up and down from a normally horizontal position, as desired.

Formed on the inner end of the shaft are opposed notches 15$^a$ and 15$^b$. These notches are, in effect, cams. Inside the casing 13 are the inner ends of two links, an upwardly extending one 17 and a downwardly extending one 18. Each of these links has a slot 19 therein, and each has shoulders 20 thereon. Shoulders 20 are formed by reducing the width of the links to provide extensions 21 that project through slots 22 in the casing. The slotted end of link 17 engages cam or notch 15$^a$ and the slot of link 18 engages cam or notch 15$^b$.

Link 17 has its outer extremity passed through a transverse pin 23 on the upper end of the brake band 24. In order to provide an adjustable connection between link 17 and pin 23, the extremity of the link is threaded and a nut 25 is provided thereon. A compression spring 26 embracing the exterior of link 17 and interposed between the housing 13 and the end of the brake band normally serves to hold the brake in released position.

The extremity of link 18 is attached to the other end of the brake band, as indicated at 27.

One end of operating cable 9 is attached to arm 16 of the brake shaft 15 for one wheel, and the other end of the cable attaches to arm 16 of the other brake unit. This arrangement provides a self equalizing operating connection for connecting pedal F and the two brake units.

Under normal conditions, the parts assume the position shown in Fig. 6. If the wheel is going forward, that is, in the direction of the arrow of Fig. 5, and the brake pedal is operated to partially rotate shafts 15, the parts move to the position shown in Fig. 5. This is so, because of the fact that when shaft 15 begins to rotate, it pulls down on link 17 and lifts up on link 18, bringing the brake band into frictional engagement with the brake drum. The rotation of the wheel, when the band begins to tighten, causes a downward pull on link 18. It also tends to pull link 17 down. The downward pull on link 18 causes shaft 15 to tilt down, keeping shoulders 20 of link 18 in engagement with the housing 13, as shown in Fig. 5. This relieves shaft 15 of the load of the downward pull of link 18, as this pull is now transmitted directly to housing 13. When shaft 15 rotates further, it tends to draw link 17 down in the direction into which it is naturally urged by the rotation of the wheel. Consequently, a very light pressure on the foot pedal serves to set the brakes, when the car is moving forward, and the natural action between the brake band and the brake drum is utilized to the best advantage. When pressure is relieved from the foot pedal, the spring 26 acts to release the brake. Since the downward pull of link 18 against shaft 15 is relieved, the brake releases easily without a tendency to bind.

When the wheel rotates, or has a tendency to rotate, in the opposite direction, as when the car is backing, the operation is just the reverse of that described. Link 17 and shaft 15 move up until shoulders 20 of link 17 engage the housing, as shown in Fig. 4.

While shaft 15 always rotates in the same direction, the movement of the links is determined and controlled entirely by the rotation of the brake drum.

What I claim is:

1. The combination with a brake drum, of a brake band, a slotted link connected with one end of the brake band, a second slotted link connected with the other end of the brake band, and a common operating shaft operatively connected with the links, said shaft having a free end entered in the slots and transversely movable with the links.

2. The combination with a brake drum, of a brake band, a slotted link connected with one end of the brake band, a second slotted link connected with the other end of the brake band, a floating shaft having opposed cams with which the respective links engage, and support in which the shaft is rotatably and movably carried, and co-operating means on the links and support for limiting the movement of the links.

3. The combination with a brake drum, of a brake band, a fixed supporting member, an operating shaft carried by the supporting member having a pair of opposed cam members on its inner end, said inner end being movable up and down from a horizontal position, an upwardly extending link engaging one of the cams, a downwardly extending link engaging the other cam, the ends of the respective links being connected with the respective ends of the brake band, said links having abutments thereon positioned to engage the supporting member to limit the movement of the links.

4. The combination with a brake drum, of a brake band, a supporting member, a pair of oppositely movable links connected with opposite ends of the brake band, respectively, co-operating means on the links and supporting member normally in engagement for limiting the spreading movement of the links, and an operating shaft having opposed cams thereon with which the links engage, said shaft being rotatable and having a limited transverse movement in the direction of pull on the links and co-acting with the links to effect a braking movement of the band only in the direction of movement of the drum.

5. The combination with a brake drum, of a brake band, a fixed supporting member having a housing thereon, a shaft rotatably mounted in the housing and having one end projecting out of the housing, said shaft having a bearing in the housing at only one point whereby its inner end is free to oscillate in the housing, opposed cam surfaces on the inner end of the shaft, a shouldered link in the housing having a slotted inner end engaging one of the cams of the shaft and having its other end extending through the housing, a second similar link reversely arranged engaging the other cam, said links having their outer ends connected with the respective ends of the brake band, the shoulders on the links being arranged to contact with the housing to limit the spreading movement of the links.

6. The combination with a vehicle having a pair of wheels and brake drums associated therewith, of a brake band for each brake drum, means adjacent each drum for contracting the band, always in the direction of rotation of the drums, said means including a floating rotatable shaft having an operating extension thereon and slotted links, a cable connected with the extensions of each shaft, and a pedal operatively connected with the cable.

7. A brake structure having a floating band, an operating member for engagement with the band adjacent opposite ends thereof to control contraction and expansion, and means mounting said member for change of location of its main axis out of parallelism with the axis of the band incident to contraction and expansion of said band.

8. A brake structure having a floating band, an operating member for engagement with the band adjacent opposite ends thereof to control contraction and expansion, fixed means mounting said member for change of location of its main axis out of parallelism with that of the band incident to contraction and expansion of said band, and means overcoming the tendency of the band to move circumferentially with the means braked.

9. A brake structure having a band, a shaft to control the application and release of the band, means mounting said shaft for rocking and tilting movement, and means moved by the shaft coacting with the band adjacent opposite ends thereof to control the contraction and expansion of the band.

10. A brake structure having a band, a member operable to control the application and release of the band, mounting means having a bore in which the member is located, said bore being enlarged toward one end to enable the member to tilt.

11. A brake structure having a floating band to engage a braking surface, means adapted to be rocked to vary the position of its main axis out of parallelism with the axis of the band to control application and release of the band, and means to prevent movement of the band with the means braked.

12. A brake structure having a floating braking member to engage a braking surface, a tiltable floating means operable to control application and release of the member, and means overcoming the tendency of the member to turn with the means braked.

13. A brake structure having a band for coaction with a drum, and floating means to control the application and release of the band, said means having a floating movement in a path substantially concentric with the axis of the drum.

14. A brake structure having a brake member for coaction with a drum, and means mounted for rotation and for movement in a path concentric with the axis of the drum to control the application and release of the brake member.

In testimony whereof I affix my signature.

JOHN F. RICHARDSON.